United States Patent [19]

Eminger et al.

[11] Patent Number: 4,732,338
[45] Date of Patent: Mar. 22, 1988

[54] AUTOMATIC IN-SLOT COIL WINDER

[75] Inventors: Robert J. Eminger; Donald L. Van Gilder; Vincent R. Williamson, Jr., all of Fort Wayne, Ind.

[73] Assignee: Windamatic Systems, Inc., Fort Wayne, Ind.

[21] Appl. No.: 835,655

[22] Filed: Mar. 3, 1986

[51] Int. Cl.$^4$ .................. H02K 15/02; H02K 15/085
[52] U.S. Cl. .................................. 242/1.1 R; 29/732; 140/92.1
[58] Field of Search ............ 242/1.1 R, 1.1 E, 7.05 R; 29/596, 732, 736; 140/92.1

[56] References Cited

U.S. PATENT DOCUMENTS

| | | | |
|---|---|---|---|
| Re. 25,281 | 11/1962 | Moore | 242/1.1 R |
| 3,131,465 | 5/1964 | Eminger | 29/732 |
| 3,685,119 | 8/1972 | Geber | 29/736 |
| 3,812,570 | 5/1974 | Mason | 242/1.1 R X |
| 3,881,238 | 5/1975 | Mason | 242/1.1 R X |
| 4,074,418 | 2/1978 | Pearsall | 29/596 |
| 4,151,636 | 5/1979 | Lauer et al. | 29/736 X |
| 4,199,115 | 4/1980 | Lachey | 242/1.1 R |
| 4,296,543 | 10/1981 | Hamane et al. | 29/596 |
| 4,383,356 | 5/1983 | Fichtner | 29/732 X |
| 4,393,904 | 7/1983 | Muskulus | 29/596 X |
| 4,416,058 | 11/1983 | Henry et al. | 29/596 X |

Primary Examiner—Stuart S. Levy
Assistant Examiner—Joseph J. Hail, III
Attorney, Agent, or Firm—Pearne, Gordon, McCoy & Granger

[57] ABSTRACT

A coil winding system is disclosed in which wire directing shrouds are installed in a stator where the winding is performed to direct the wire of the coils into the proper position within the stator. An automated system provides a loading gripper head for picking up an unwound stator at a pick-up position on a supply conveyor and for transferring such unwound stator to a loading-unloading position on an indexing table. A shroud gripper subsequently installs the shrouds in the stator at the loading-unloading position and the stator and shrouds are locked with respect to the table. The indexing table then transports the unwound stator to a winding position and simultaneously moves a wound stator to the loading unloading position. The shroud gripper then removes the shrouds and an unloading gripper transports the wound stator to a discharge conveyor. The loading of an unwound stator, the installation of the shrouds, the removal of the shrouds from a wound stator, and the removal of the wound stator occur while the winding is taking place so that high outputs are achievable.

15 Claims, 19 Drawing Figures

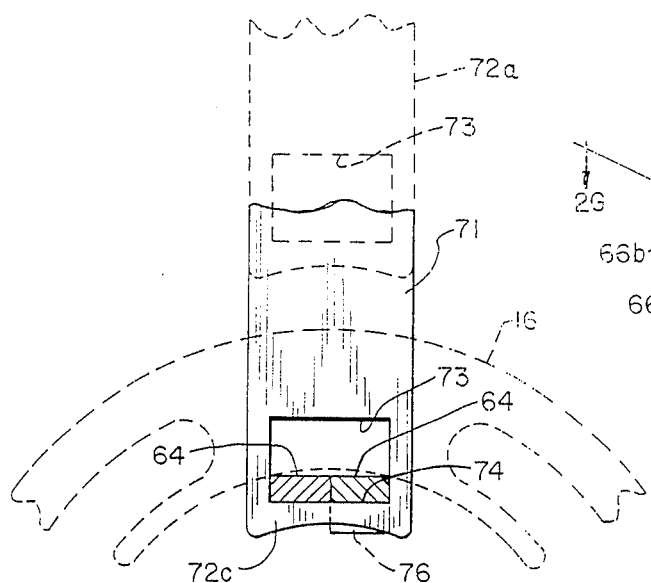
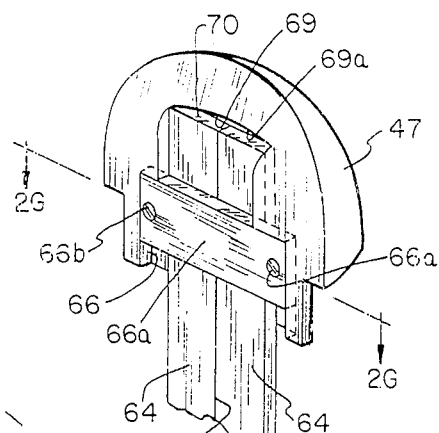
FIG. 2A
FIG. 2F
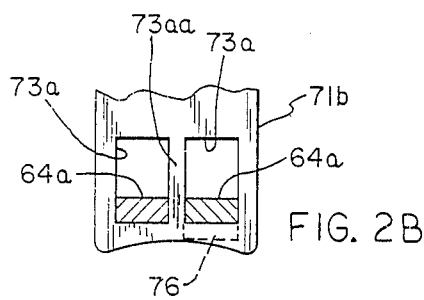
FIG. 2B
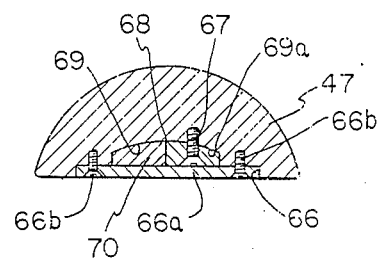
FIG. 2G
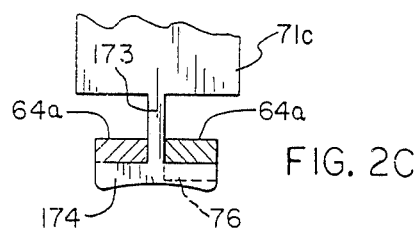
FIG. 2C
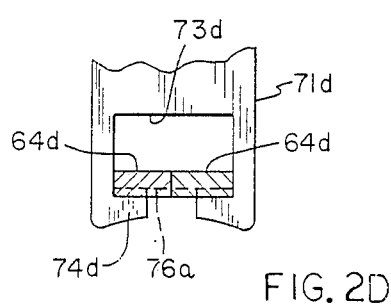
FIG. 2D
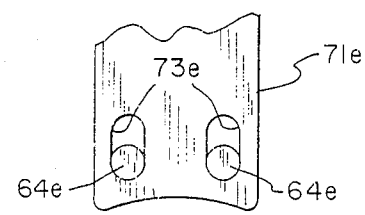
FIG. 2E

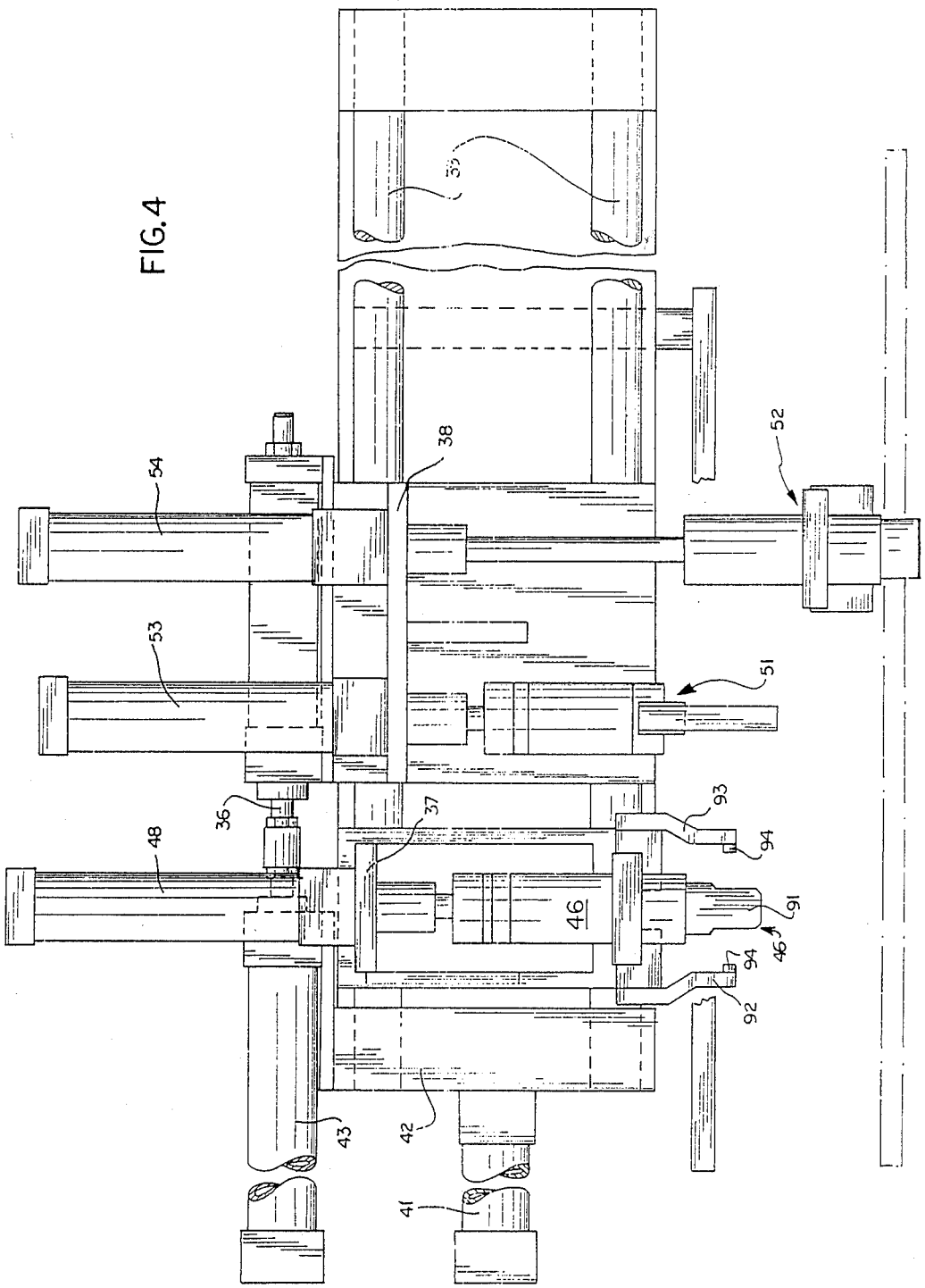

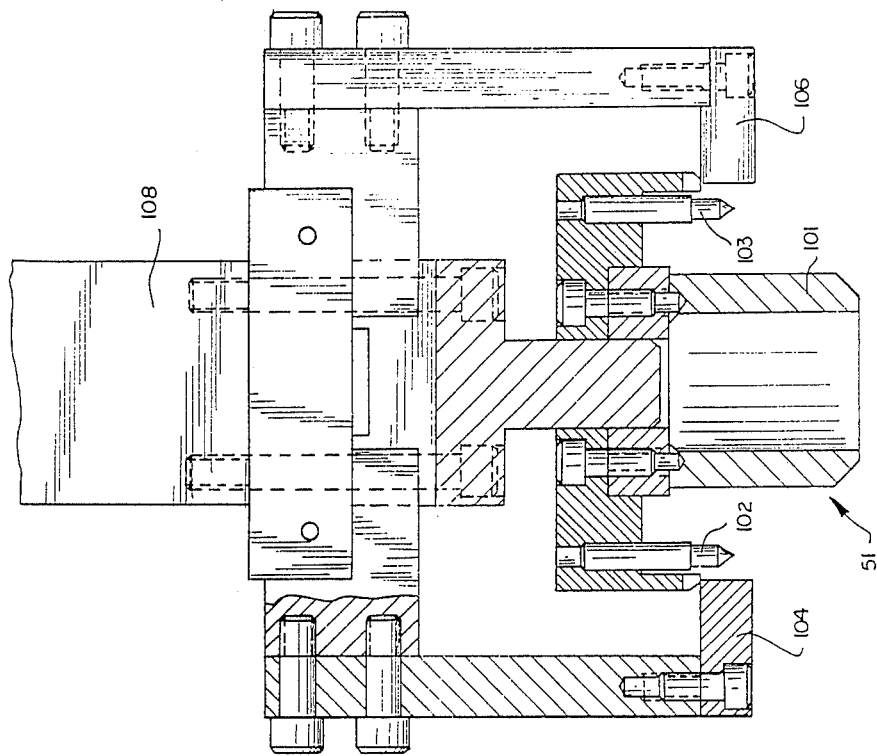
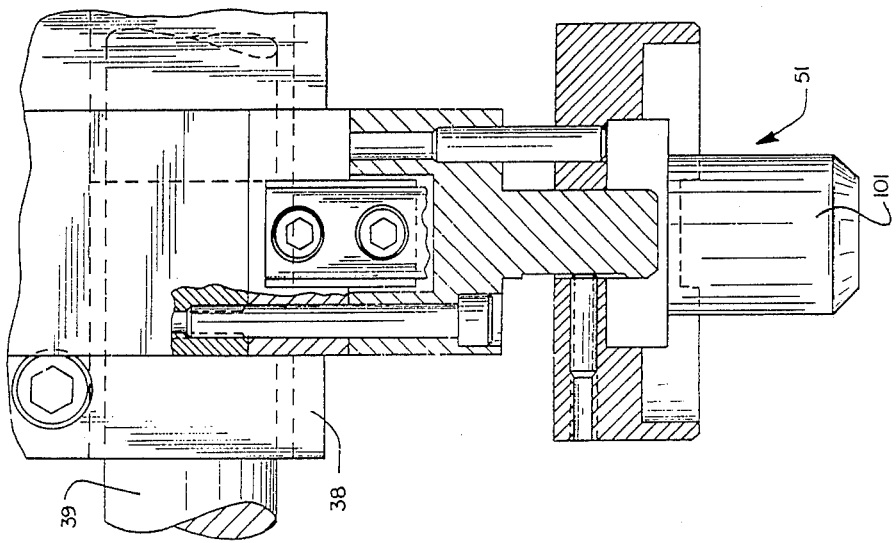

AUTOMATIC IN-SLOT COIL WINDER

BACKGROUND OF THE INVENTION

This invention relates generally to the winding of a coil of wire on a component of a dynamoelectric machine, and more particularly to a novel and improved automated system for supplying such component for winding and removing the component after the winding is completed.

PRIOR ART

Coil winding machines are known in the prior art. In some machines, the component, such as a stator or rotor as the case may be, is manually loaded into the winding machine, and after winding is manually removed.

It is also known to provide an indexing table so that the components can be loaded and unloaded at locations spaced from the winding position, and moved to and from the winding position by the indexing operation of the table.

It is also known to provide automatic loading and unloading operations on machines having indexing tables.

Still further, it is known to position removable shrouds on the component during the winding to direct the wire into the desired location during the winding operation. The placement and removal of such shrouds, however, complicate the automation of the process. Further, high production rates have normally not been achieved when such shrouds are involved.

SUMMARY OF THE INVENTION

Broadly stated, this invention is directed to a novel and improved, high output automation system for loading and unloading a coil winding machine with components to be wound, and in which shrouds must be temporarily installed in the component during the winding operation.

The illustrated embodiment of this invention operates to load and unload motor stators. However, the invention is also applicable to the loading and unloading of other components on which wire coils must be wound. Therefore, as used herein, the term "dynamoelectric component or component" as used herein is not intended to restricted to stators, per se, but is intended to include other types of dynamoelectric devices on which a coil or coils are wound.

There are a number of aspects to this invention. In accordance with one important aspect, a novel and improved automated system is provided with adjacent conveyors, one for supplying stators or the like to a pick-up position, the other for removing the wound stators or the like from a delivery position, and in which gate or stop means are provided to automatically and accurately position the unwound stators at such pick-up positions.

In accordance with another aspect of this invention, an automated system is provided for loading and unloading stators in a winding machine in which a single carriage provides a loading gripper head and an unloading gripper head both of which move in unison and operate to load a stator and remove a wound stator during each cycle of operation so as to provide a high system output.

In accordance with another aspect of this inventin, an automated system is provided for installing shrouds in a stator and positioning such stator for winding and for subsequently removing the shrouds from the wound stator and removing the wound stator from the winding machine.

In accordance with a further aspect of this invention, an automated system for loading and unloading, a coil winding machine is arranged so that substantially all of the loading and unloading operations occur while the winding machine is actually winding the coil so that high system output can be achieved, and so that the loading and unloading functions do not limit such output.

Still another aspect of this invention is the provision of a novel and improved shroud mounting structure for stators and the like which allows easy installation and removal within a stator or the like and provides a strong and reliable support for the shrouds during the winding operation.

In accordance with a further aspect of this invention, an automated system is provided for a coil winding machine in which a first carriage supports a loading gripper head and an unloading gripper head and a second carriage provides a shroud gripper head wherein the carriages are moved in an interrelated manner to provide the system with high output.

These and other aspects of this invention are illustrated in the accompanying drawings, and are more fully described in the following specification and drawings.

BRIEF DESCRIPTION OF THE DRAWINGS

FIG. 2A is a fragmentary section taken substantially along section line 2A—2A of FIG. 7 showing the shroud-mounting bars locked against the bore of a stator by means of reciprocable locking bars, the stator being partially shown in phantom;

FIGS. 2B through 2E are views similar to FIG. 2A showing different designs of the shroud-mounting and locking bars;

FIG. 2F is a fragmentary perspective view of one shroud bulb with two mounting bars rigidly mounted thereto;

FIG. 2G is a cross-section taken substantially along section line 2G—2G of FIG. 2F;

FIG. 4 is a fragmentary, side elevation, illustrating the various gripper heads which operate to supply unwound stators to the indexing table, install and remove shrouds in the stators, and remove wound stators from the indexing table;

FIG. 5 is a fragmentary, side elevation of the gripper heads for transporting unwound stators between the supply conveyor and the indexing table;

FIG. 5A is a fragmentary, partial section of the gripper illustrated in FIG. 5 but taken along a plane perpendicular to the plane of FIG. 5;

DETAILED DESCRIPTION OF THE DRAWINGS

Figure 1:
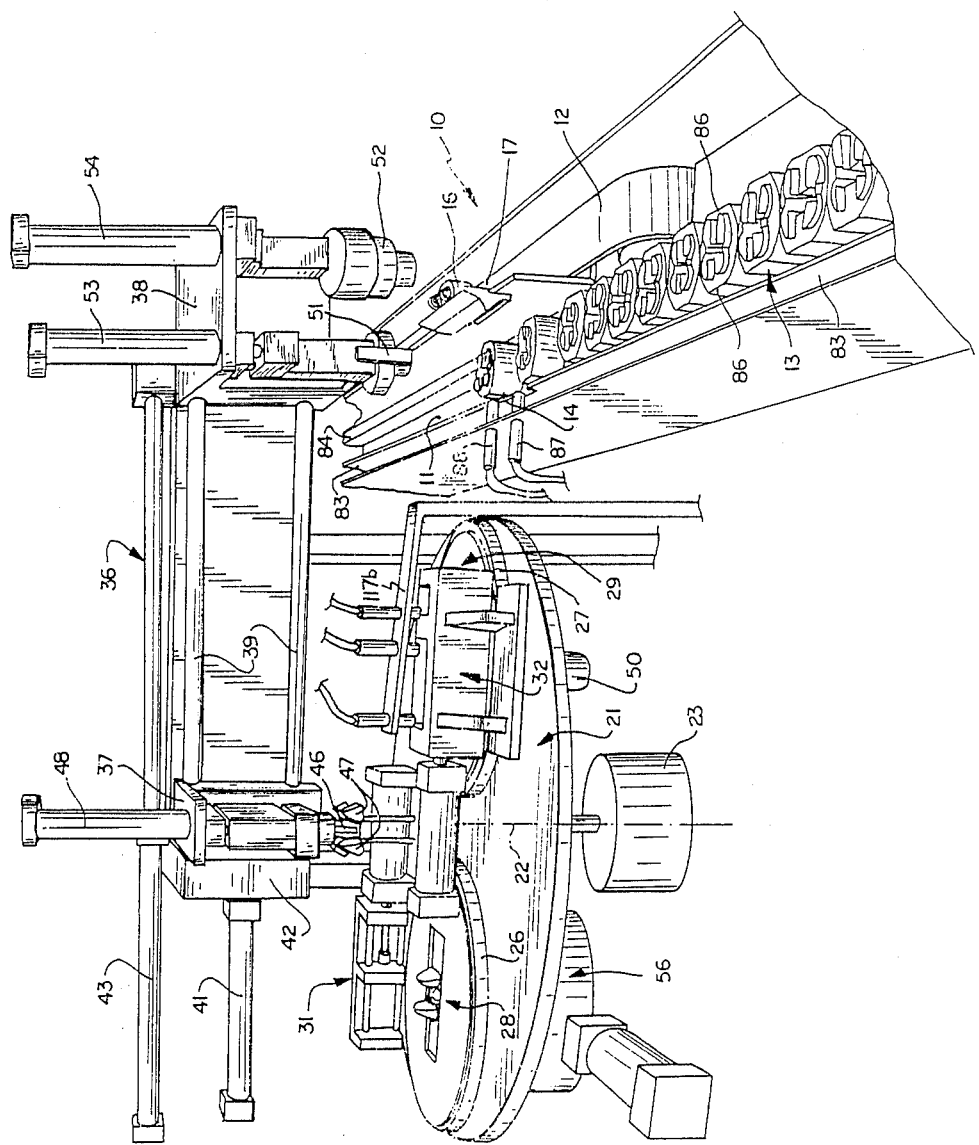
FIG. 1 is an overall perspective view of an automated winding system in accordance with the present invention, with parts removed for purposes of clarity.

FIG. 1 illustrates the overall arrangement of an automated winding system in accordance with the present invention. This particular embodiment is arranged to wind the stator of a two-pole electric motor. A conveyor system 10 provides two conveyors, namely, a supply conveyor 11 and a discharge conveyor 12. Such conveyors are of the endless belt type, and operate respectively to carry unwound stators 13 to a pick-up position at 14 and to subsequently remove wound stators 16 to a discharge position 17. In the illustrated embodiment, the two conveyors 11 and 12 are immediately adjacent to each other and extend parallel to each other. With such an arrangement, a single conveyor system can be used to supply two or more winding systems, as discussed below.

An indexing table 21 is provided laterally to one side of the conveyor assembly in alignment with the pick-up position 14 and the discharge position 17, and is journaled for oscillating rotation about a vertical central axis 22. A rotary actuator 23 is connected to rotate the indexing table 21 back and forth through an arc of 180 degrees, as discussed in more detail below, but may rotate in the same direction in cyclic steps of one hundred eighty degrees (180 degrees).

The indexing table is provided with two nests 26 and 27, which rotate 180 degrees back and forth between a winding position 28 occupied by the nest 26 in FIG. 1 and a loading-unloading position 29 occupied by the nest 27 in FIG. 1. A pair of locking systems 31 and 32 are mounted on the indexing table 21 and are respectively associated with the nests 26 and 27. Such locking systems function to lock the stator and the shrouds in the respective nests as discussed in detail below.

Mounted above the conveyor assembly 10 and the indexing table 21 is a gripper and transfer assembly 36 which includes two gripper carriages 37 and 38, both supported by parallel guide rods 39, for movement in the direction of the length of such rods. A first piston-and-cylinder actuator 41 is connected between the machine frame 42 and the first carriage 37, and is operable to move such carriage between the retracted position illustrated in FIG. 1 and an extended position directly over the loading-unloading position 29. A second piston-and-cylinder actuator 43 is connected between the frame 42 and the carriage 38, and is operable to move the second carriage 38 between an extended position, illustrated in FIG. 1, over the conveyor assembly and retracted positions over the loading-unloading position 29.

Mounted on the first carriage 37 is a shroud gripper head 46 which is operable to grip a pair of shrouds 47 for installation in a stator to be wound and for removal from a wound stator, as discussed in greater detail below. The shroud gripper head 46 is vertically movable by an actuator 48 mounted on the carriage 37 between a raised position, illustrated in FIG. 1, and a lowered position in which the shrouds are installed in or removed from a stator.

Mounted on the gripper carriage 38 are two gripper heads 51 and 52. The first or loading gripper head 51 operates to grip unwound stators 13 at the pick-up position 14 and to transfer such unwound stators to the loading-unloading position 29. The second or unloading gripper head 52 operates to remove wound stators 16 from the loading-unloading position 29 and to deposit such wound stators on the discharge conveyor 12 at the discharge position 17. A piston-and-cylinder actuator 53 is carried by the carriage 38 and operates to raise and lower the loading gripper head 51, and another actuator 54 mounted on the carriage 38 is connected to raise and lower the unloading gripper 52.

The gripper transfer assembly 36 operates through repeated cycles, as follows. The carriage 37 is extended to a position over the loading-unloading position 29 and the gripper head 46 is lowered so as to grip the shrouds 47 contained in the wound stator 16. At the same time, a lower shroud gripper head assembly 50 extends up and grips the lower shrouds. The gripper head 46 is then raised to remove the upper shrouds 47 and the lower shrouds are simultaneously removed from below the wound stator.

The carriage 37 is then retracted to the position of FIG. 1 so as to clear the loading-unloading position 29, and the carriage 38 traverses to position the gripper head 52 over the wound stator in the loading-unloading position 29. Such gripper head is then lowered to grip the wound stator, and is raised back up to remove the stator from the loading-unloading position. The carriage then extends a short distance to position the gripper head 51 over the loading-unloading position, and it is lowered to deposit in the loading-unloading position 29 an unwound stator 13 previously removed from the pick-up position 14. The carriage 38 is then extended to the illustrated position of FIG. 1 over the conveyor assembly 10 and the carriage 37 is extended to a position over the loading-unloading position 29. The gripper head 46 then lowers and installs the shroud 47 in the unwound stator at the loading-unloading position 29, where they are clamped in a manner discussed in detail below. At the same time, the lower shrouds are raised up into the installed position within the unwound stator.

It should be noted that in each direction of traverse of the carriage 38, one or the other of the gripper heads 51 or 52 is transporting a stator. As the carriage 38 moves from the conveyor assembly 10 to the loading-unloading position 29, it transports an unwound stator for positioning in the loading-unloading position. On extension of the carriage 38 from the loading-unloading position to the conveyor assembly, however, the gripper head 51 is empty but the gripper head 52 transports a wound stator to the discharge position 17. Consequently, the gripper heads carried by the carriage 38 transport a stator, either wound or unwound, during each direction of movement.

When the unwound stator with the shrouds installed is fixed in the loading-unloading position 29 by locking system 32, the indexing table 21 rotates through 180 degrees to position the unwound stator in the winding position 28 and simultaneously moves the wound stator previously wound at the winding position 28 to the loading-unloading position 29. While the stator is located at the winding position 28, a winder operates to wind the coils on the stator. During such operation, the previous wound stator is removed from the indexing table and a subsequent unwound stator is installed at the loading-unloading position. Consequently, the various operations which must be performed in loading and unloading stators and shrouds occur simultaneously with the winding operation occurring at the winding station 28. As a result, the output of the machines is determined almost entirely by the time it takes to wind a stator at the winding station 28, and the loading and unloading operations do not limit the output of the entire system, except when the winding time is less than the load and unload time. The important feature is that the functions of winding and load-unload occur simultaneously.

The winding mechanism 56 may be of any known type capable of winding the particular dynamoelectric component involved. Therefore, the winding mechanism illustrated at 56 is only illustrated in a schematic manner and forms part of this invention only insofar as it cooperates generally in the entire system. One suitable type of winding mechanism is illustrated in U.S. Pat. No. 3,821,903, and such patent is incorporated herein by reference. However, other known winding systems or mechanisms may be utilized so long as such mechanism is capable of winding the particular type of dynamoelectric component involved.

Figure 2:
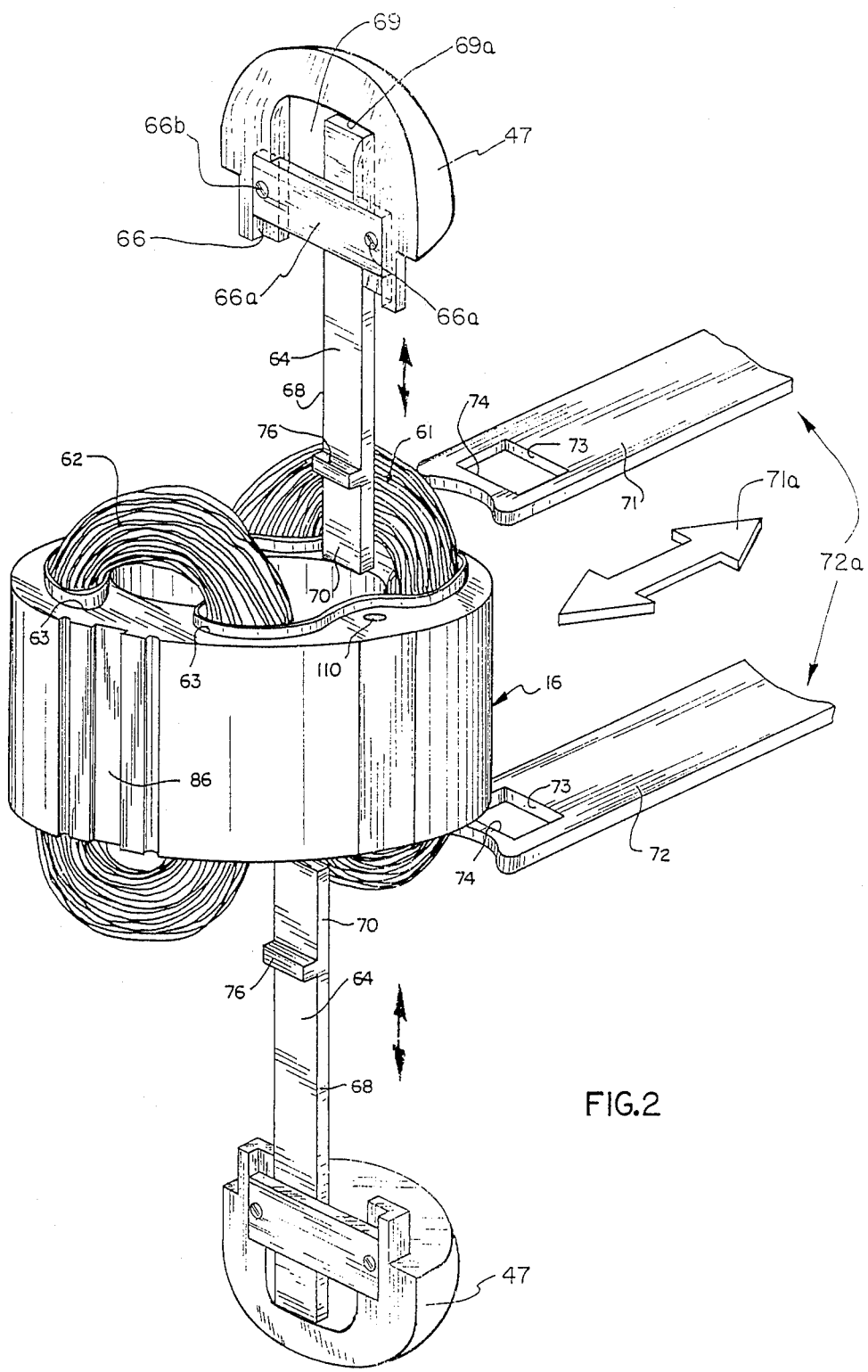
FIG. 2 is an enlarged, fragmentary perspective view of a stator wound with an automated system in accordance with the present invention, illustrating the shrouds partially removed from the completed, wound stator.

FIG. 2 illustrates the stator 16 which is wound by the illustrated embodiment of this invention. Also illustrated is one pair of the two pairs of shrouds 47, which are installed in the stator during the winding operation. For purposes of illustration, only one of the two pairs of shrouds is illustrated, and it should be understood that identical but opposite pairs of shrouds are mounted on the stator during the winding operation. The shrouds function to correctly direct the wire of the two coils 61 and 62 into the slots 63 during the winding operation so that the coils will be properly positioned within the stator.

The four shrouds are identical in structure and are oppositely positioned so a description of one shroud applies equally to all of them.

Mounted on each shroud is a mounting or back bar 64 which extends through the stator 16 when installed therein. Each of the bars 64 is secured at one end by means of a screw 67 to a shroud 47 in a laterally offset position as shown so that the inner side edge 68 of each bar 64 is positioned along the plane of symmetry of the associated shroud 47. The shroud 47 is undercut or recessed at 69a as shown to receive with a close fit the bar 64. The shroud is further recessed at 66 to receive with a close fit a rectangular plate 66a which is secured in place by means of two screws 66b. The recess 69a is deeper than recess 66 and is of a size and shape which, in combination with the bar 64, provides a socket or pocket 69 having a shape which receives with a close sliding fit the end 70 of the other bar 64 when the shrouds are installed in the stator. Consequently, when installed, each of the shrouds 47 is rigidly supported by two mounting bars 64, namely the bar which is actually screwed to the shroud, and the end 70 of the bar of the other shroud of the pair which fits into elongated pocket 69. With this structure, both of the bars of each of the pairs provide support for the two shrouds of the pair. See FIGS. 2F and 2G.

The locking of the shrouds within the stator 16 and the locking of the stator within the associated nest during the winding operation is accomplished by a pair of locking bars 71 and 72. Such bars are reciprocable in the direction of their length (see arrow 71a) by a mechanism described in detail below between a retracted position 72a illustrated in FIGS. 2 and 2A, clear of the stator, a fully extended position 72B to allow insertion or removal of the associated shrouds, and a locking position 72C (FIG. 2A). Each of the locking bars is provided with an opening 73 sized to receive with clearance the two mounting bars 64 of the associated pair of shrouds 47.

The upper locking bar 71 is positioned to extend in along the upper side of the stator and the lower bar 72 is positioned to extend along the lower face of the stator. It should be understood that a similar pair of locking bars is provided for the other pair of shrouds as indicated in phantom in FIG. 7. Again, for purposes of simplication, only one pair of locking bars is illustrated in FIG. 2, but a similar pair extends toward the stator from the diametrically opposite side for the other pair of shrouds, which again are not illustrated in FIG. 2.

The shrouds are mounted and removed from the stator in the following manner. First, the mounting bars 71 and 72 are moved to their extended positions 72B (FIG. 7), in which the openings 73 and 74 provide clearance to allow vertical movement of the associated pair of shrouds to their installed position, in which the heads of the shroud are positioned substantially against the associated locking bar and adjacent upper and lower faces of the stator. Such vertical movement causes the mounting or back bars 64 to project through the openings 73 of the two mounting bars 71 and 72 until the ends 70 of the mounting bars project into the opposed pockets 69. The locking bars 71 and 72 are then withdrawn until the forward edge 74 of the opening 73 engages the mounting bars and clamp such mounting bars against the sides of the central opening in the stator 16.

In order to ensure that the mounting bars cannot, under any circumstance, move out of the mounting position while clamped, each of the mounting bars is provided with a projection 76 which moves past the edge 74 of the opening of the remote locking bar 71 or 72 while such bar is in an extended position. Such projection subsequently functions to provide a positive mechanical lock to prevent movement of the mounting bar out of the proper locked position once the locking bars are clamped. Therefore, the locking of the shrouds in the mounting position does not depend solely on frictional gripping but, instead, is provided by a positive mechanism locking system.

When the shrouds are to be removed, the locking bars 71, 72 are moved to the extended position 72B (FIG. 7) so that the shroud-mounting bars 64 can be withdrawn. The locking bars 71, 72 are then retracted clear of the wound stator as shown in FIG. 2 so as to permit removal of the stator by the second gripper head 52, as discussed above. Of importance is the fact that each shroud has a mounting bar 64 rigidly secured thereto, and these two bars 64 are rigidly locked together and to the stator when installed. This ensures that shrouds 47 are rigidly located to the stator during winding.

With reference to FIGS. 2A through 2E, FIG. 2A illustrates the retracted and locked positions 72A and 72C of the locking bars 71, 72 described above. FIG. 2B shows a modification in the form of the shroud-mounting bars 64a being laterally spaced to fit slidably within two windows 73a having a solid divider 73aa therebetween. The shroud-locking structure otherwise is as described above.

FIG. 2C shows the use of space locking bars 64a but a further modified form of locking bar 71c. This bar 71c has as T-shaped head instead of a window 73, the shroud-mounting bars 64a being separated with stem portion 173 and clamped by the cross-bar portion 174.

FIG. 2D shows bars 64d like 64 except for the projection 76, this being replaced by a notch 76a in each bar 64d. The locking bars 71, 72 each have a partial window 73d as shown, with the edge of one inwardly projection portion 74d snugly fitting into the notch when the bars 71d, 72d are retracted to locked position 72c (FIG. 2A). This prevents longitudinal movement of shroud bars 64d.

FIG. 2E shows the shroud bars 64e as being circular in cross-section and the locking bars as having slots 73e which receive for sliding movement the bars 64e. These bars 64e at the distal ends snugly fit into companion shroud pockets as previously explained thereby securely locking each shroud 47 against movement. Each bar 64e may be provided with a notch-like notch 76a or a projection like projection 76 for locking each shroud bar against withdrawal when installed in a stator.

It should be noted that while positive locking devices such as projections 76 and notches 76a have been disclosed, these may in some cases be omitted thereby solely relying on frictional engagement of the shroud bars with the inner surface of the stator bore.

Of special importance is the fact that when the shrouds are installed into a stator, the securement is rigid and unyielding. This results in the first instance by securely affixing one end of each shroud bar to a respective shroud and in the second instance by the opposite end of each shroud bar snugly slidably fitting into a companion pocket or socket in the other shroud; thus, each shroud bar is securely fitted to both shrouds when installed in a stator. This constitutes an improvement over known prior art arrangements.

Figure 3A:
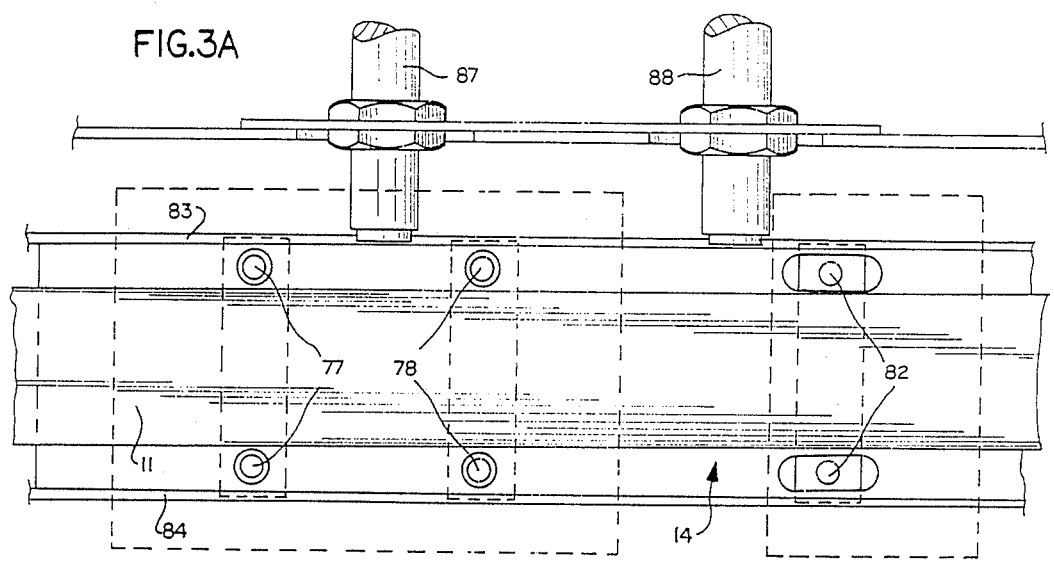
FIG. 3A is a plane view of the conveyor and locating system of FIG. 3.
Figure 3:
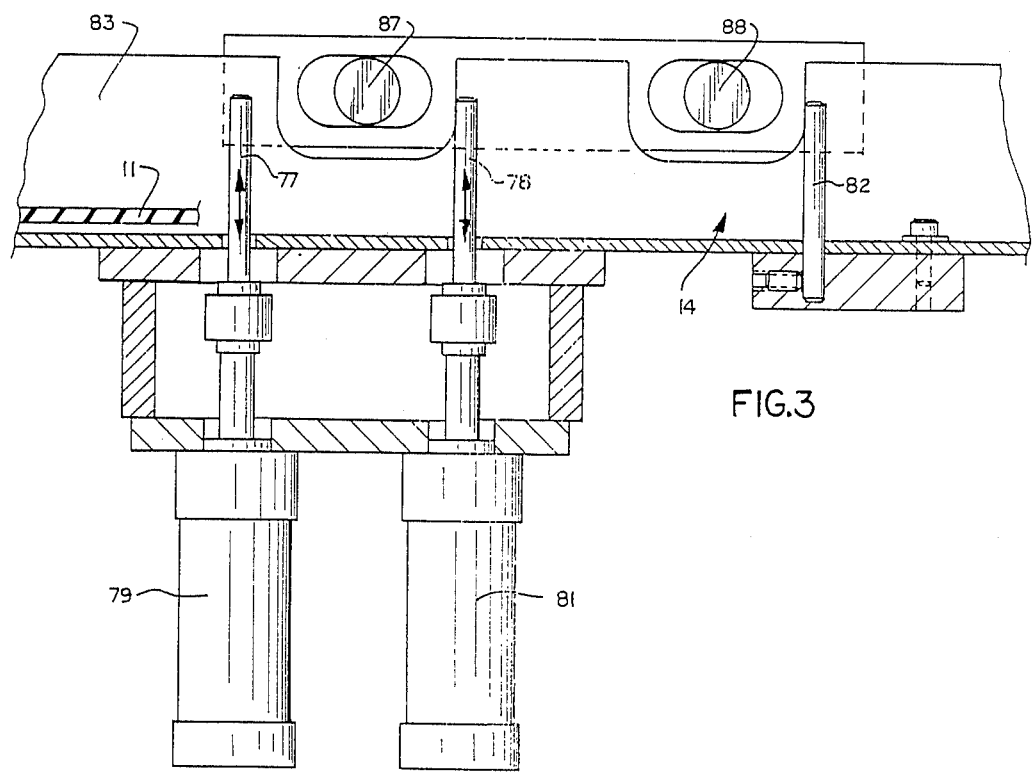
FIG. 3 is a fragmentary side elevation of the conveyor gating system for positioning stators along the supply conveyor in a position for gripping by the gripper head and transfer to the indexing table of the winding machine.

FIGS. 3 and 3A illustrate a positioning system provided along the supply conveyor 11 to sequentially and accurately position unwound stators 13 at the pick-up position 14. Referring to FIG. 3, two pairs of retractable stop pins 77 and 78 are provided, with one stop pin of each pair on each side of the conveyor 11, as best illustrated in FIG. 3A. The first pair of stop pins 77 are extended and retracted by a piston-and-cylinder actuator 79 and the second pair of stop pins are retracted and extended by an actuator 81. When the stop pins are extended, they project above the surface of the conveyor belt of the conveyor 11, and operate to engage and restrain the movement of unwound stators 13 with the belt. For example, if stators carried along by the belt engage the pins 77, they are held against movement by the conveyor belt, and merely remain in position as the conveyor belt continues to move. Similarly, a stator engaging the pair of pins 78 to held against movement with the conveyor belt 11.

Downstream along the length of the conveyor 11 are a pair of fixed stop pins 82 (for a single winding machine set-up) which engages a stator when it is at the pick-up position 14 for gripping by the first gripper head 51. A pair of rails 83 and 84 are mounted along opposite sides of the supply conveyor 11 and function to quide the unwound stators 13 as they are carried along the conveyor. These guide rails further function to maintain the proper orientation of the stators on the conveyor, since the stators are provided with opposed flats 86 (illustrated in FIG. 1), which are spaced apart a distance closely approximating the spacing between the two rails 83 and 84. Consequently, as the stators move along with the conveyor, they are automatically maintained in the proper orientation for subsequently gripping and transporting to the load-unloading position.

This conveyor arrangement is significant for the reason that it carries stators in an upright position; i.e. with the stator ends in horizontal planes. Thus, if fewer or greater numbers of laminations are used, the resulting change in stack height does not require alternation of the conveyor system.

While side rails 83 and 84 are useful in orienting stators having diametrically opposed flat sides 86 for pick-up, it should be noted that round stators can be handled provided some means such as locating pins on conveyor 11 spaced to register with holes 110, are employed.

A pair of sensors 87 and 88 are mounted on the machine frame adjacent to the space between the stop pins 77 and 78 and the stop pins 78 and 82, respectively. Such sensors 87 and 88 are of any suitable type, such as proximity sensors or photosensors. Their function is to determine whether a stator is located in either or both of the two positions.

The stop pins function to ensure that the single stator is positioned in the pick-up position 14 for being gripped by the first gripper head 51. These stop pins function through the following cycle. If the sensor 87 determines that a stator is not present against the stop pins 78, the actuator 79 retracts the pin 77, allowing one stator to move past the pin until it comes to rest against the stop pins 78. The spacing between the stop pins 77 and 78 is such that the stop pins 77 can then be raised by the actuator 79 between the stator engaging the stop pins 78 and the next adjacent stator moving along the conveyor.

Subsequently, when the sensor 88 determines that a stator is not positioned against the fixed stop pin 82, the actuator 81 is operated to lower the stop pins 78 while the stop pins 77 remain extended. This allows a single stator to move along with the conveyor until it engages the fixed stop pins 82 and is located in the pick-up position 14. At such time, the sensor 87 determines that the adjacent portion of the conveyor is empty and the stop pins 78 are raised while the stop pins 77 are lowered to position a subsequent stator in the ready position for feeding to the pick-up position 14.

Figure 6:
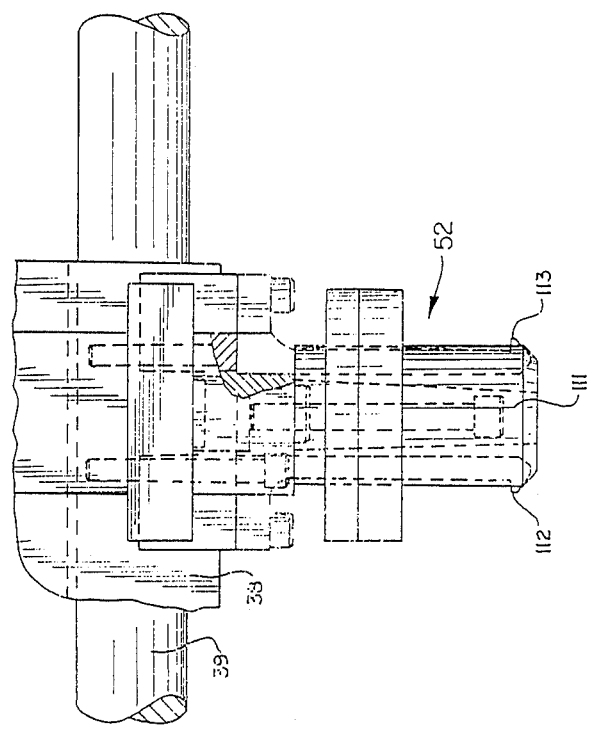
FIG. 6 is a fragmentary view of the gripper head which operates to remove wound stators from the indexing table.
Figure 7:
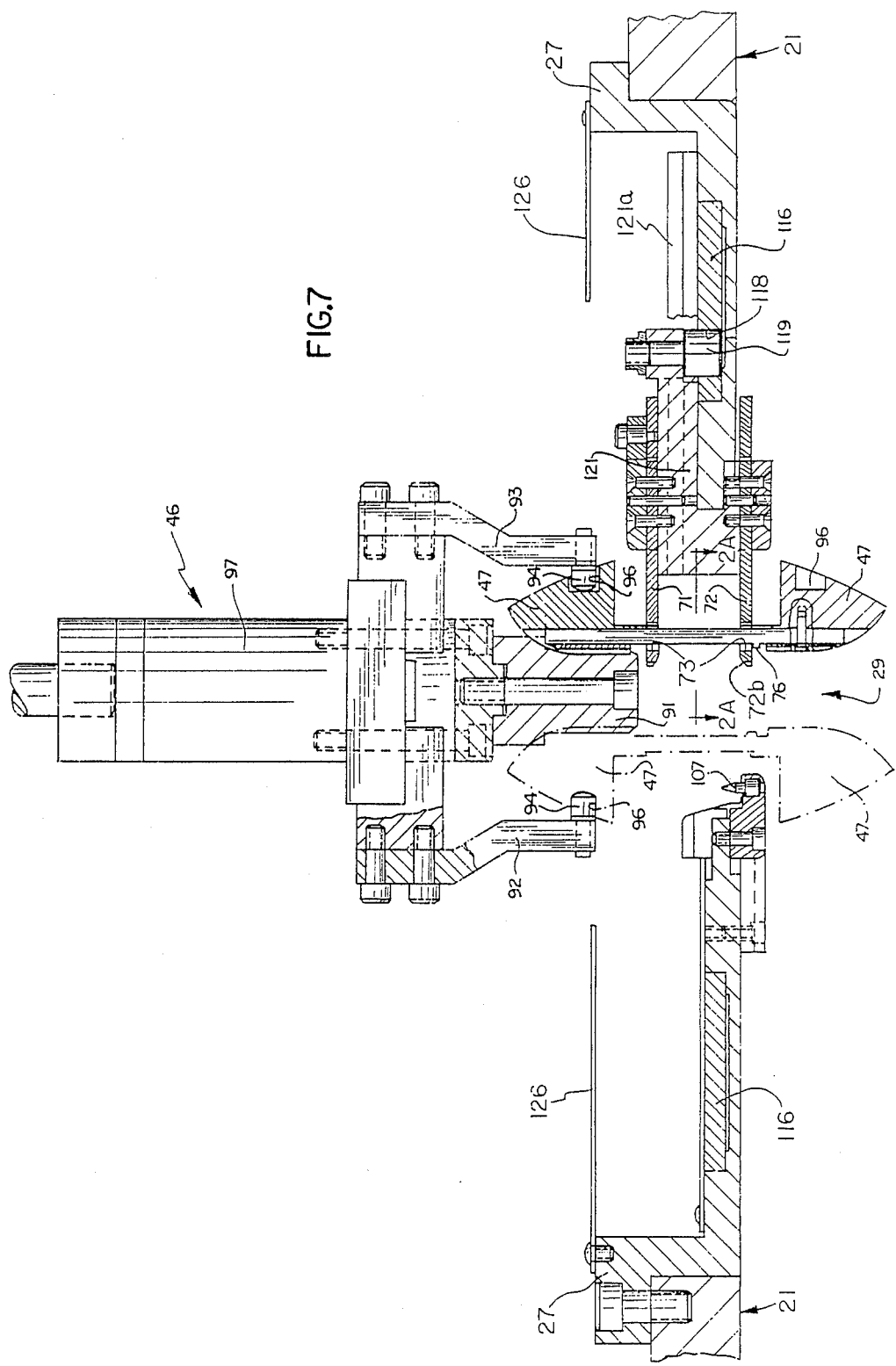
FIG. 7 is a fragmentary view, with parts removed for purposes of illustration, showing the gripper head for installing and removing shrouds and the mechanism for locking the shrouds in the installed position.

FIGS. 4 through 7 illustrate the structure of the various gripping head 46, 51 and 52. The gripping head 46, as mentioned previously, is raised and lowered by an actuator 48 and is traversed between its extended and retracted positions by an actuator 41. The gripper itself is provided with a central projection 91 at which fits between the two pairs of upper shrouds 47 to maintain their proper spacing when they are gripped and removed from the stator. The gripper head also includes a pair of opposed gripper fingers 91 and 93, each provided with an inwardly extending lug 94, as best illustrated in FIG. 7. Such projections 94 move into mating recesses 96 formed in each of the shrouds 47 and, in cooperation with the projection 91 grip the associated shroud for movement to and from the stator.

In FIG. 7, the stator is not illustrated in order to simplify the drawings, and only one of the pairs of shrouds is illustrated in full-line, while the other is illustrated in phantom. A piston-and-cylinder structure is provided within the housing 97 of the gripper head 46 and is connected to move the gripper fingers 92, 93 toward and way from each other between the gripping position illustrated and the release position in which the projections move clear of the recesses 96. The details of such structure are not illustrated in order to simplify the understanding of the basic invention involved, since persons skilled in the art are aware of the various types of mechanisms for opening and closing gripper fingers, and the specific mechanism forms no part of the present invention except that it must provide powered opening and closing of the gripper fingers.

While the locking bars 71 and 72 are in the extended position 72B (FIG. 7) and the gripper fingers 92 and 93 are closed, the actuator 48 operates to raise the upper shrouds clear of the stator positioned in the load-unloading position and, subsequently, the actuator 41 retracts to move the upper pair of shrouds completely clear of the loading-unloading position 29 to provide access for the other grippers at such position.

An identical gripper head 46 is located between the loading-unloading position on the lower head assembly 50, and functions to grip and remove the lower shrouds 47 in the same manner. Such gripper assembly 50, however, is not provided with a traverse actuator, since it is not necessary to move the lower shrouds clear of the loading-unloading position because the removal of the wound stator from such position and the subsequent installation of an unwound stator occur from above such position.

When the shrouds are subsequently reinstalled in the next unwound stator, the reverse movements occur, and after the shrouds are properly positioned in the unwound stator, the locking bars 71 and 72 are retracted to the locking position as shown in FIG. 2A in which the mounting bars are clamped against the side of the unwound stator.

The gripper head 51, which transports unwound stators from the supply conveyor to the loading-unloading position, provides a structure, best illustrated in FIGS. 5 and 5A. Here again, such gripper head is provided with a central projection 101 chamfered at its lower ends for ease of entry into the central opening of an unwound stator 13. Positioned on either side of the central projection 101 are locating pins 102 and 103 sized and located so as to project into tie bolt holes in the stator to ensure that the unwound stator is accurately positioned within the gripper head when it is gripped at the pick-up position 14.

Here again, the gripper head is provided with an opposed pair of gripper fingers 104 and 106, which are powered for movement between a closed or gripping position and an open or released postion. When the gripper head 51 is lowered onto an unwound stator 13 at the pickup position 14, the gripper fingers 104, 106 are closed against the outside of the stator and provide sufficient gripping so that the gripper head lifts the unwound stator as it is raised by its actuator 53 for traverse to a position immediately above the loading-unloading position 29. The actuator 53 then extends to position the unwound stator in the loading-unloading position 29 for the subsequent installation of the shrouds and the winding of the coils.

As illustrated in FIG. 7, locating pins 107 are provided at the loading-unloading position. Such pins are structured and positioned so that they extend up into tie bolt holes 110 at the lower face of the unwound stator when the stator is deposited in the loading-unloading position 29. Such locating pins are tapered to cam the stator, to ensure accurate location and orientation of the stator in such position.

Here again, a piston-and-cylinder actuator is preferably provided in the gripper head housing 108 to power the opening and closing of the gripper fingers 104 and 106.

The gripper head 52, which removes the wound stators from the loading-unloading position and deposits such wound stators on the discharge conveyer 12, is best illustrated in FIG. 6. Here again, the gripper head 52 is provided with a central projection 111, which is proportioned to fit snugly within the opening in the wound stator. In addition, the gripper head provides a pair of opposed, hook-shaped gripper fingers 112 and 113, which extend down along the projection and are movable inwardly to release and outwardly to grip. Such fingers 112 and 113, when they spread, extend outwardly under the wound stator to secure the stator in the gripper head for transportation from the loading-unloading position to the discharge conveyor 12, where they are subsequently deposited for movement out of the machine.

Figure 8:
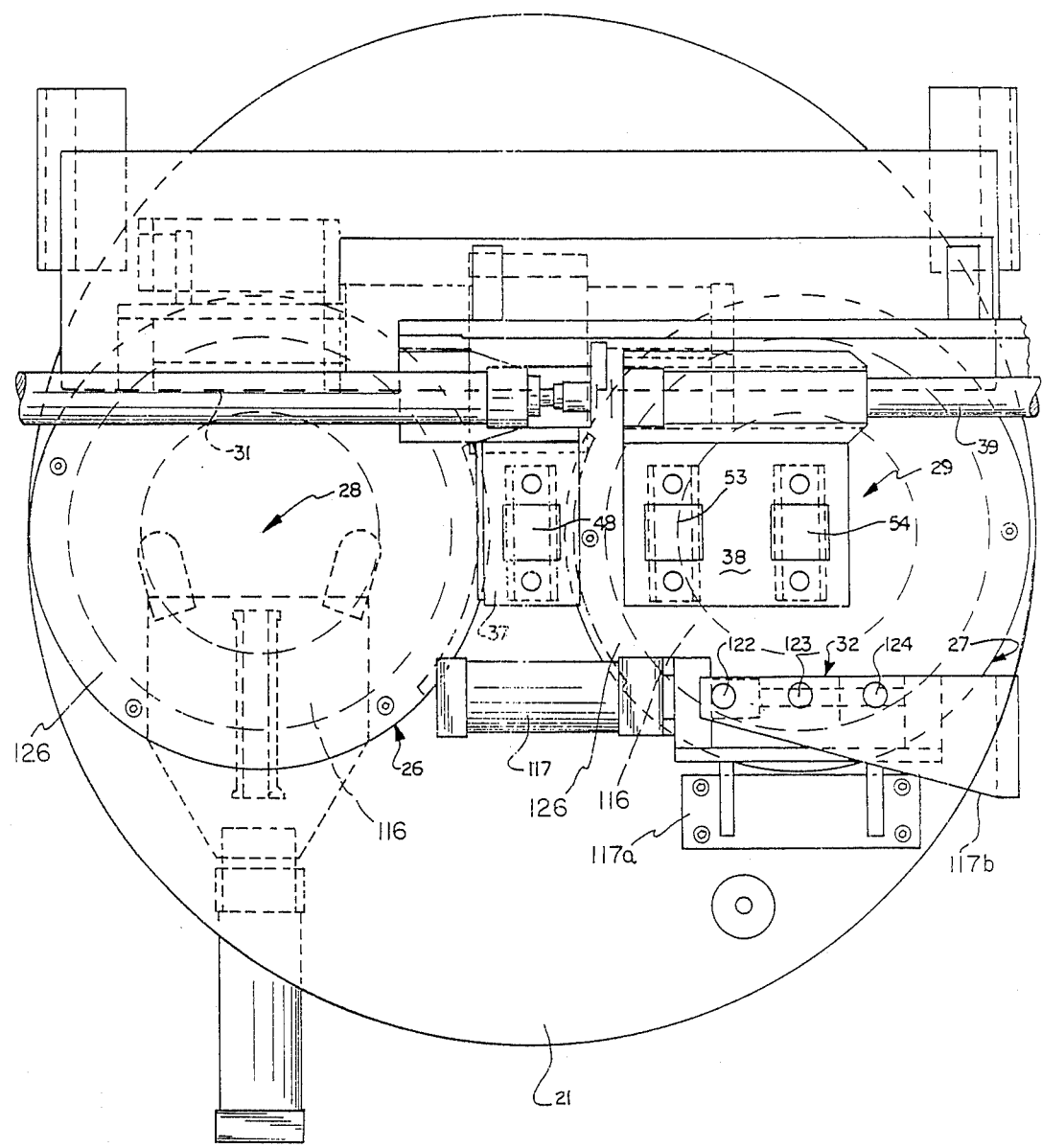
FIG. 8 is a plan view of the indexing table which provides nests at the loading-unloading position and at the winding position.
Figure 9:
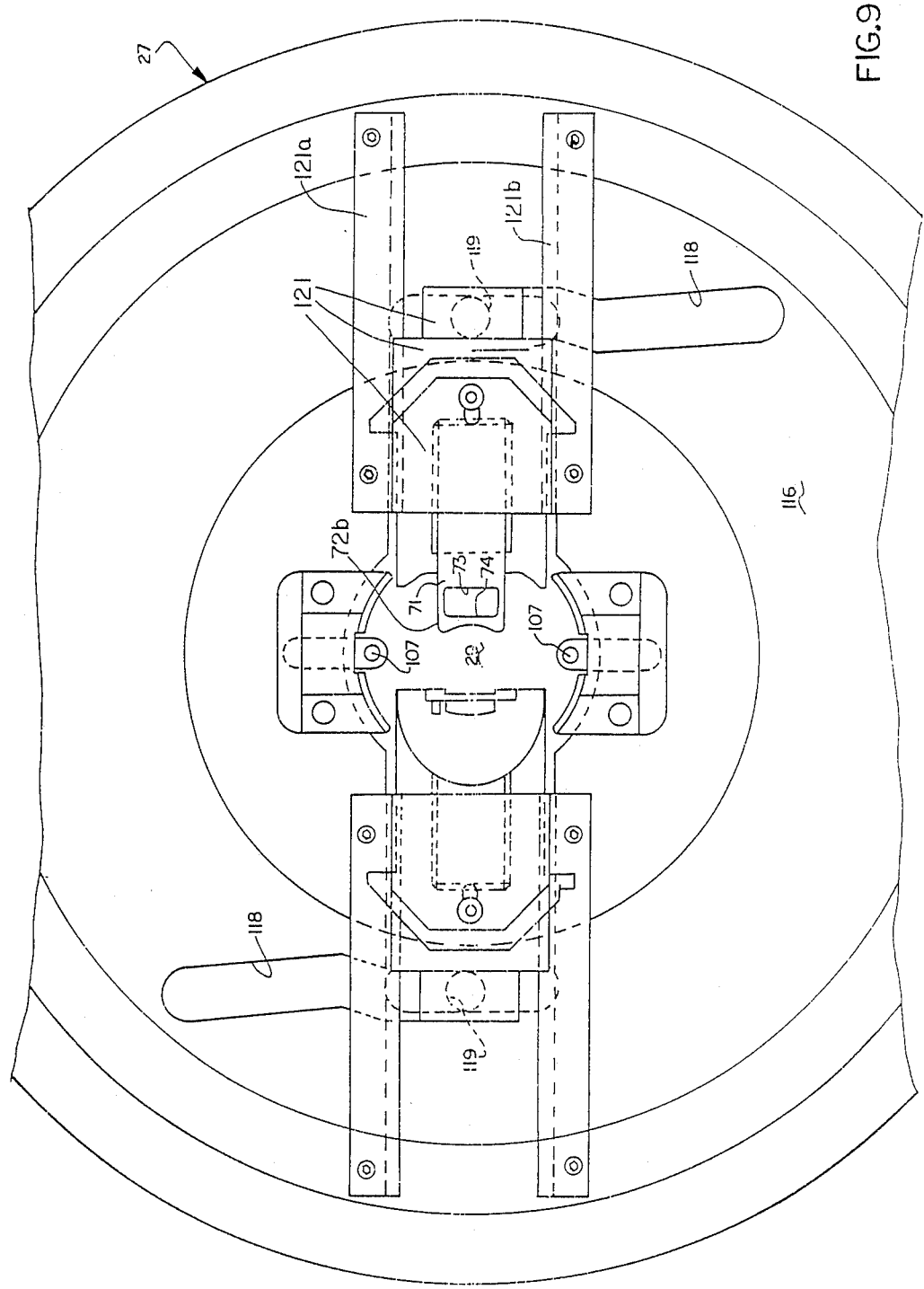
FIG. 9 is an enlarged fragmentary view of one of the nests on the indexing table.

Referring to FIGS. 7, 8 and 9, the two nests 26 and 27 are provided on diametrically opposite sides of the indexing table 21 so that rotation of the table through 180 degrees moves the nests between the winding position 28 and the loading-unloading position 29. In the illustrated embodiment, the indexing table is rotated by the motor 23 through 180 degrees one direction and subsequently back through 180 degrees in the opposite direction. However, if desired, the indexing table can be rotated in step wise movement through 180-degree arcs in the same direction.

Each nest has the same structure, so only the nest 27 will be described in detail, with the understanding that such description applied equally to the structure of the nest 26. An annular cam plate 116 is journaled for oscillating rotation about the central axis of the nest by the locking system 31, 32. A piston-and-cylinder actuator 117 is fixedly mounted on the indexing table 21 by means of a frame 117a and is connected to the cam plate 116 to rotate it back and forth for the operation of the locking bars 71, 72.

The cam plate 116 is formed with a pair of similar but opposite cam grooves 118 proportioned to receive a cam follower 119 (illustrated in FIG. 7), which is carried by a gripper bar mounting carriage 121. This carriage 121 is in the form of a flat plate parallel to cam plate 116 and nest plate 27 mounted to reciprocate in gibs 121A and 121B, these gibs being fixedly secured to the nest plate 27. The cam grooves 118 are shaped so that when the cam followers are located with respect to the cam grooves 118, as illustrated in FIG. 9, the associated gripping or locking bars 71 and 72 are extended to allow for the installation or removal of the associated shrouds 47. However, when the cam plate rotates in an anti-clockwise direction from such position, the cam follower is moved radially outward to the intermediate or locking position in which the back or mounting bars of the shrouds are clamped against the sides of the stator.

When the cam plate 116 rotates in an anticlockwise direction to the extreme of its rotary movement, the follower retracts the locking bars 71 and 72 completely clear of the stator. Such action can only occur when the shrouds are removed, but is necessary to allow the stators to be removed and installed in the loading-unloading position 29. A cover plate 126 (shown partially in FIG. 7) overlies the respective nest 26, 27.

Three sensors 122, 123, 124 are mounted on a stationary frame plate 117b adjacent to the locking system 32 to provide a signal indicating the position of the cam plate 116, and in turn the position of the locking bars 71, 72 so that the control system is supplied with information to indicate when the locking bars 71, 72 are in each of the three positions, namely, the extended position 72B (FIG. 7) for installation and removal of the shrouds, the locking position 72C (FIG. 2A) for gripping the shrouds, and the retracted position 72A (FIG. 2A) in which the locking bars are clear of the stator.

The respective locking systems 31 and 32 are maintained in the locked position (FIG. 2A) while the unwound stator is transported to the winding position 28, and subsequently until the wound stator completed at the winding position is returned to the load-unloading position 29.

Figure 10:
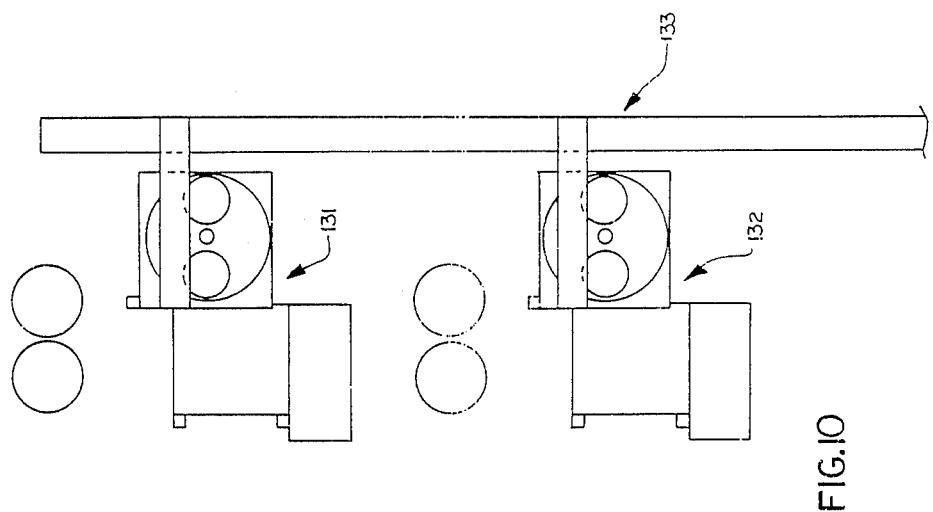
FIG. 10 is a schematic, plan view illustrating the manner in which two separate machines can be combined with a single conveyor system for delivering unwound stators and for removing wound stators.

FIG. 10 illustrates the manner in which a single conveyor system can be used to supply and discharge two or more separate winding machines. Each of these winding machines 131 and 132 is provided with the same structure described above in connection with the single winding machine system, and a single conveyor system 133 providing a supply conveyor and a discharge conveyor as discussed above extends along side of both of the winding systems 131 and 132. In such case, the positioning system for the upstream machine is modified to permit the retraction of the fixed stop pins 82 of FIG. 3 and FIG. 3A, so that all of the stop pins 77, 78, and 82 can be retracted to allow stators to move past the upstream machine to the downstream machine. Otherwise, the various components of the total system are identical to the system described above.

With the winding system in accordance with the present invention, high outputs can be achieved even through the shrouds are required for positioning the coils in the stator. Such high output is achieved because simultaneous operations are performed. For example, while the coils are actually being wound on the stator, the previously wound stator is removed from the loading-unloading position and a subsequent unwound stator is installed in its place. Further, while the gripper carriage 38 is traversing to the conveyor for delivery of the wound stator to the discharge conveyor and picking up an unwound stator for subsequent delivery to the loading-unloading position, the shrouds are installed in the unwound stator and locked in position. All of these operations occur and are completed while the winding of the coils takes place. Further, the indexing time of the table is very short, so very little time is consumed in the indexing operation itself.

For purposes of controlling the sequence of operation just explained, a state-of-the art controller may be used. It is programmed to perform these functions.

With the machine in accordance with the present invention disclosed herein, production rates of 320 wound stators per hour have been obtained and when additional machines are supplied by the same conveyor system, the output rate can be multiplied by the number of systems involved.

While other grippers 46, 51 and 52 may be used, a working embodiment of this invention utilized Model 7921 as manufactured by PHD, Inc. of Fort Wayne, Ind.

Although the preferred embodiment of this invention has been shown and described, it should be understood that various modifications and rearrangements of the parts may be resorted to without departing from the scope of the invention as disclosed and claimed herein.

What is claimed is:

1. A coil winding system comprising a conveyor means operating to deliver unwound dynamoelectric components on which coils are to be wound to a pick-up position and removing wound components from a discharge position, said conveyor means including positioning means operating to accurately position said unwound components at said pick-up position, indexing means providing at least two nests sequentially moving between a loading-unloading position and a winding position, separate loading and unloading gripper heads, said loading head operating through a cycle to grip an unwound component at said pick-up position and transferring said unwound component to said nest at said loading-unloading position, said unloading head operating through a cycle to grip a wound component at said loading-unloading position and transfer said wound component to said discharge position, a shroud gripper head operating through a cycle to position a shroud in an unwound component in said loading-unloading position and subsequently remove said shroud from a wound component at said loading-unloading position, and a coil winder operating through a cycle to wind a coil or coils on said component while said gripper heads operate to remove a wound component from said loading-unloading position and load an unwound component therein.

2. A coil winding system as set forth in claim 1, wherein all of said gripper heads operate through complete cycles of operation while said coil winding system completes a cycle of operation.

3. A coil winding system as set forth in claim 1, wherein a first carriage supports said load gripper and said unloading gripper for movement between said loading-unloading position and the associated pick-up and discharge positions, and a separate carriage supports said shroud gripper for movement between a position at said loading-unloading position and a retracted position clear thereof.

4. A coil winding system as set forth in claim 3, wherein said loading and unloading grippers are spaced apart on said first carriage by a distance equal to the spacing between said pick-up and discharge positions.

5. A coil winding system as set forth in claim 4, wherein said conveyor means includes a supply conveyor for delivering unwound components to said pick-up positions, and a discharge conveyor substantially parallel thereto for removing wound components from said discharge position.

6. A coil winding system comprising conveyor means delivering unwound dynamoelectric components to a pick-up position and removing wound dynamoelectric components from a discharge position, a coil winder, indexing means for moving components from a loading-unloading position to said coil winder for winding coils thereon and for subsequently returning said components to said loading-unloading position, and transfer means operating through repeated cycles of sequential steps of:

(a) moving an unwound component from said pick-up position to said loading-unloading position;

(b) positioning a shroud in said unwound component;

(c) removing said shroud from a wound component; and (d) moving said wound component from said loading-unloading position to said discharge position.

7. A coil winding system as set forth in claim 6, wherein said system includes locking means releasably locking said shrouds in a component while a coil is wound thereon.

8. A coil winding system comprising a supply conveyor operating to supply unwound dynamoelectric components to a pick-up position, a discharge conveyor operating to receive wound components at a discharge position substantially adjacent said pick-up position, said system providing a loading-unloading position in which unwound components are deposited for subsequent winding and from which wound components are removed, said loading-unloading positions being spaced from said pick-up position and said discharge position, a transfer carriage moving from a first position adjacent to said pick-up and discharge positions to a location adjacent to said loading-unloading position, a loading gripper on said carriage operating to grip and transport unwound components from said pick-up position to said loading-unloading position, and an unloading gripper operating to transport wound components from said loading-unloading position to said discharge position, said loading and unloading grippers being spaced from each other by a distance equal to the spacing between said pick-up and discharge positions, said loading gripper operating to pick up an unwound component at said pick-up position and said unloading gripper operating to deposit a wound component at said discharge position when said carriage is in said first position.

9. A coil winding system as set forth in claim 8, wherein said carriage operates when adjacent to said loading-unloading position to sequentially move said unloading gripper into position for removing a wound component from said loading-unloading position and moving said loading gripper into position for installing an unwound component in said loading-unloading position.

10. A coil winding system as set forth in claim 8, wherein said supply conveyor provides stops accurately positioning a single component at said pick-up position and separating said single component from other components carried by said supply conveyor.

11. A coil winding system as set forth in claim 10, wherein said supply conveyor provides spaced rails guiding components to said pick-up position and maintaining a predetermined orientation thereof.

12. A coil winding system as set forth in claim 11, wherein said components are formed with opposed flats and said rails are spaced apart a distance substantially equal to the spacing between said flats.

13. A coil winding system as set forth in claim 12, wherein said components have a hole therein, and said loading gripper provides a locating pin which projects into said hole to maintain a predetermined orientation of a component gripped in said loading gripper.

14. A coil winding system as set forth in claim 13, wherein said loading-unloading position provides a locating pin which projects into said hole to maintain a predetermined orientation of a component therein.

15. A coil winding system as set forth in claim 14, wherein said carriage is movable back and forth along a predetermined line of movement, and all of said loading-unloading, and discharge positions are spaced from each other in a direction parallel to said line of movement.

* * * * *